US012767818B2

(12) United States Patent
Bewsher et al.

(10) Patent No.: US 12,767,818 B2
(45) Date of Patent: Oct. 20, 2026

(54) AQUEOUS BIOPOLYMER DISPERSIONS

(71) Applicant: AQUASPERSIONS LIMITED, Halifax (GB)

(72) Inventors: Alan Bewsher, Yorkshire (GB); Paul Smith, Yorkshire (GB); Jade Rowley, Yorkshire (GB)

(73) Assignee: AQUASPERSIONS LIMITED, Halifax (GB)

( * ) Notice: Subject to any disclaimer, the term of this patent is extended or adjusted under 35 U.S.C. 154(b) by 589 days.

(21) Appl. No.: 18/272,047

(22) PCT Filed: Jan. 13, 2022

(86) PCT No.: PCT/EP2022/050687

§ 371 (c)(1),
(2) Date: Jul. 12, 2023

(87) PCT Pub. No.: WO2022/152813

PCT Pub. Date: Jul. 21, 2022

(65) Prior Publication Data

US 2024/0101816 A1 Mar. 28, 2024

(30) Foreign Application Priority Data

Jan. 13, 2021 (EP) .................................... 21151459

(51) Int. Cl.

| | |
|---|---|
| ***C08L 67/04*** | (2006.01) |
| ***C08J 7/04*** | (2020.01) |
| ***C08K 5/00*** | (2006.01) |
| ***C08K 5/07*** | (2006.01) |
| ***C08K 5/092*** | (2006.01) |
| ***C09D 7/20*** | (2018.01) |
| ***C09D 7/63*** | (2018.01) |
| ***C09D 7/65*** | (2018.01) |
| ***C09D 167/04*** | (2006.01) |

(52) U.S. Cl.

CPC ................. *C08L 67/04* (2013.01); *C08J 7/04* (2013.01); *C08K 5/0025* (2013.01); *C08K 5/07* (2013.01); *C08K 5/092* (2013.01); *C09D 7/20* (2018.01); *C09D 7/63* (2018.01); *C09D 7/65* (2018.01); *C09D 167/04* (2013.01); *C08J 2367/04* (2013.01); *C08L 2201/50* (2013.01); *C08L 2205/02* (2013.01); *C08L 2205/035* (2013.01)

(58) Field of Classification Search

CPC ...... C08L 67/04; C08L 67/02; C08L 2205/02; C08L 2201/50; C08L 2201/54; C08L 2201/52

See application file for complete search history.

(56) References Cited

U.S. PATENT DOCUMENTS

| | | | |
|---|---|---|---|
| 2005/0192410 | A1 | 9/2005 | Scheer et al. |
| 2018/0171559 | A1 | 6/2018 | Hipps, Sr. et al. |
| 2020/0290327 | A1 | 9/2020 | Nissenbaum |

FOREIGN PATENT DOCUMENTS

| | | | |
|---|---|---|---|
| EP | 2631060 | A1 | 8/2013 |
| EP | 1566409 | B1 | 6/2016 |
| FR | 3076744 | B1 | 1/2021 |
| JP | H 08-295792 | * | 11/1996 |
| JP | 2004-018744 | * | 1/2004 |
| JP | 2004/204038 | * | 7/2004 |
| JP | 2004-323640 | * | 11/2004 |
| JP | 2005008733 | A | 1/2005 |
| WO | 2002085969 | A2 | 10/2002 |
| WO | 2005052075 | A1 | 6/2005 |
| WO | 2008007919 | A1 | 1/2008 |
| WO | 2010013483 | A1 | 2/2010 |
| WO | 2014017715 | A1 | 1/2014 |
| WO | 2014060754 | A2 | 4/2014 |
| WO | 2015059709 | A1 | 4/2015 |
| WO | 2016067285 | A1 | 5/2016 |
| WO | 2017151595 | A1 | 9/2017 |
| WO | 2018184897 | A1 | 10/2018 |
| WO | 2018184898 | A1 | 10/2018 |
| WO | 2018229343 | A1 | 12/2018 |
| WO | 2019094738 | A1 | 5/2019 |
| WO | 2020036843 | A1 | 2/2020 |
| WO | 2020242872 | A1 | 12/2020 |
| WO | 2021054948 | A1 | 3/2021 |
| WO | 2021079026 | A1 | 4/2021 |
| WO | 2022003195 | A1 | 1/2022 |
| WO | 2022014408 | A1 | 1/2022 |

(Continued)

OTHER PUBLICATIONS

Translation of JP 2004-018744 (Year: 2004).*

(Continued)

*Primary Examiner* — Robert C Boyle
(74) *Attorney, Agent, or Firm* — Nyemaster Goode P.C.

(57) ABSTRACT

An aqueous biopolymer dispersion composition comprises:

a blend of two or more biopolymers, consisting of polycaprolactone (PLC) and one or more selected from the group consisting of: polybutylene adipate terephthalate (PBAT), polybutylene succinate (PBS), polybutylene succinate adipate (PBSA), polylactic acid (PLA), poly (3-hydroxybutyrate) (PHB) and mixtures thereof, a stabilising agent selected from the group consisting of: polyvinyl alcohol, fatty alcohol ethoxylates, ethylene oxide/propylene oxide (EO/PO) block copolymers, salts of fatty acids and mixtures thereof, a cross linking agent;

an optional rheology modifier;

optional further ingredients; and water.

19 Claims, No Drawings

(56) References Cited

FOREIGN PATENT DOCUMENTS

| | | | |
|---|---|---|---|
| WO | 2022026362 | A1 | 2/2022 |
| WO | 2022066862 | A1 | 3/2022 |
| WO | 2022066866 | A1 | 3/2022 |
| WO | 2022066878 | A2 | 3/2022 |
| WO | 2022066885 | A1 | 3/2022 |
| WO | 2022152813 | A1 | 7/2022 |
| WO | 2022204533 | A1 | 9/2022 |
| WO | 2023008959 | A1 | 2/2023 |
| WO | 2023049120 | A1 | 3/2023 |
| WO | 2023090176 | A1 | 5/2023 |
| WO | 2023137119 | A1 | 7/2023 |

OTHER PUBLICATIONS

Translation of JP 2004/204038 (Year: 2004).*
Translation of JPH 08-295792 (Year: 1996).*
Translation of JP 2004-323640 (Year: 2004).*
Patent Cooperation Treaty, "International Preliminary Report on Patentability," issued in connection with International Patent Application No. PCT/EP2022/050687, mailed Jul. 23, 2023, 8 pages.
Patent Cooperation Treaty, "International Search Report & Written Opinion," issued in connection with International Patent Application No. PCT/EP2022/050687, dated Apr. 26, 2022, 12 pages.
Office Action for Taiwan Application No. 111101475 mailed May 8, 2025, 7 pages.
Taiwan Intellectual Property Office "Search Report" issued in connection with Patent Application No. 111101475, mailed May 8, 2025, 2 pages.

* cited by examiner

AQUEOUS BIOPOLYMER DISPERSIONS

CROSS-REFERENCE TO RELATED APPLICATIONS

This application is a United States National Phase Entry application of PCT/EP2022/050687, entitled "AQUEOUS BIOPOLYMER DISPERSIONS," filed Jan. 13, 2022, which claims priority to European Patent Application No. 21151459.1, entitled "AQUEOUS BIOPOLYMER DISPERSIONS," filed Jan. 13, 2021—all of which are hereby incorporated herein by reference in their entirety, including all references cited therein.

This invention relates to biopolymer dispersion compositions, coatings using the dispersions and products made using the coatings. The invention relates particularly, but not exclusively, to compositions for making barrier coatings on substrates, for example paper, paperboard, other cellulosic materials and biopolymer films.

Aqueous polymer dispersions find a wide variety of applications, for example as adhesives, binders, rising agents, sealants, primers, inks, paints, seed coating systems and paper coatings. Such dispersions are also used in pharmaceutical dosage forms, medical testing kits and in cosmetic formulations. A major use has been to form thin barrier coatings on paper, paperboard packaging, plastic films and containers. However, synthetic polymers which have been commonly used are difficult to recycle and are not biodegradable to facilitate environmentally acceptable disposal.

Biodegradable polymers have been used but have been difficult to process, for example by extrusion into thin films. Likewise formation of films from solvent solutions of biopolymers is problematic due to toxicity, flammability and environmental pollution.

Accordingly, there is a need for a biodegradable polymer composition, referred to in this specification as a "biopolymer", which may be applied to cellulosic or other substrates to enable the resultant composite to be recyclable or compostable.

Existing biopolymer dispersions have the disadvantage of poor water resistance and a liability to blanch in use.

WOUS2017/019914 discloses aqueous biodegradable polymer dispersions, including polyvinyl alcohol as a stabilising agent and xanthan gum as a rheology modifier.

According to a first aspect of the present invention, an aqueous biopolymer dispersion composition comprises:

a blend of two or more biopolymers, consisting of polycaprolactone (PCL) and one or more further biopolymers selected from the group consisting of: polybutylene adipate terephthalate (PBAT), polybutylene succinate (PBS), polybutylene succinate adipate (PBSA), polylactic acid (PLA), poly(3-hydroxybutyrate) (PHB) and mixtures thereof, a stabilising agent selected from the group consisting of: polyvinyl alcohol, fatty alcohol ethoxylates, ethylene oxide/propylene oxide (EO/PO) block copolymers, salts of fatty acids and mixtures thereof, a cross linking agent;

an optional rheology modifier;

optional further ingredients; and water.

Compositions of the present invention are preferably free or substantially free of volatile organic solvents.

In preferred embodiments the biopolymers and other components of the composition are approved for use for food contact applications.

A preferred biopolymer is a blend of polycaprolactone (PCL) and a further biopolymer selected from polybutylene succinate (PBS), polybutylene succinate adipate (PBSA) polybutylene adipate terephthalate (PBAT) and mixtures thereof.

The blend of biopolymers may be present in the dispersion in an amount of about 10 wt % to about 80 wt %, preferably about 15 wt % to about 65 wt %, more preferably about 20 wt % to about 40 wt %, and more preferably about 30 wt % to about 40 wt % based on the total weight of the aqueous dispersion.

The ratio by weight of polycaprolactone (PCL) to the one or more further biopolymers may be in the range of PCL to further biopolymer or biopolymers of about 60:40 to about 1:20, preferably about 60:40 to about 1:19, alternatively about 60:40 to about 1:15, alternatively about 50:50 to about 1:20 or about 50:50 to about 1:19. Exemplary ratios by weight of PCL to further biopolymer or biopolymers include 60:40, 55:45, 50:50, 45:55, 1:20; 1:19, 1:15, 1:10 and 1:5 or any range between any of these values.

Alternatively or in addition, the polycaprolactone (PCL) may be present in the dispersion in an amount of about 5 wt % to about 40 wt %, preferably about 7 wt % to about 33 wt %, more preferably about 10 wt % to about 20 wt %, and more preferably about 15 wt % to about 20 wt % based on the total weight of the aqueous dispersion.

Compositions of the present invention may provide improved barrier properties and improved film formation properties. The compositions may further exhibit consistently lower film formation temperatures in comparison to previously disclosed compositions.

A lower amount of biopolymer may be used if a wax or tackifier is present in the composition.

Exemplary stabilising agents are selected from polyvinyl alcohol, fatty alcohol ethoxylates, ethylene oxide/propylene oxide (EO/PO) block copolymers, salts of fatty acids and mixtures thereof.

The stabilising agent is preferably polyvinyl alcohol.

The stabilising agent may be present in the dispersion in an amount of about 1 wt % to about 6 wt %, preferably about 2 wt % to about 4 wt %, more preferably about 2 wt % to about 3 wt %.

The polyvinyl alcohol may have a molecular weight in the range of 25000 to 200000 g/mol and a degree of hydrolysis (HD) of 70 to 98%. A blend of polyvinyl alcohol polymers may be employed. Homopolymer or copolymer polyvinyl alcohol may be employed.

The cross-linking agent may be a bifunctional carboxylic acid or a bifunctional aldehyde. The cross-linking agent may be stable during storage but is activated by drying or heating to crosslink the emulsifier.

Exemplary cross-linking agents may be selected from the group consisting of: oxalic acid, malonic acid, succinic acid, glutaric acid, pimelic acid, suberic acid, azelaic acid, sebacic acid, undercanedioic acid, dodecanedioic acid, brassylic acid, thapsic acid, japanic acid, phellogenic acid, equisetolic acid, maleic acid, fumaric acid, acetylenedicarboxylic acid, glutaconic acid, traumatic acid, muconic acid, glutinic acid, citraconic acid, mesaconic acid, itaconic acid, tartronic acid, mesoxalic acid, malic acid, tartaric acid, oxaloacetic acid, aspartic acid, α-hydroxyglutaric acid, arabinaric acid, acetonedicarboxylic acid, α-ketoglutaric acid, glutamic acid, diaminopimelic acid, saccharic acid, malondialdehyde, succinaldehyde, glutaraldehyde, isocitric acid, aconitric acid, propane-1,2,3-tricarboxylic acid, trimesic acid and mixtures thereof.

Preferred cross linking agents may be selected from the group consisting of: adipic acid, maleic acid, glyoxal, citric acid and mixtures thereof.

The cross-linking agent may be present in an amount of about 0.05 wt % to about 3 wt %.

When the cross-linking agent is glyoxal, the amount may be from about 0.05 wt % to about 0.2 wt %.

When the cross-linking agent is citric acid the amount may be from about 0.3 wt % up to about 2 wt %, preferably about 0.5 wt %.

When the cross-linking agent is maleic acid the amount may be from about 0.3 wt % up to about 3 wt %, preferably about 1 wt %.

When the cross-linking agent is adipic acid, the amount may be from about 0.1 wt % to about 1.5 wt %, preferably about 0.5 wt % to about 1.5 wt %, preferably about 1 wt %.

The amount of crosslinker employed may be higher than a stoichiometric amount. A factor affecting the amount of crosslinking is the curing time. Cure times may be short, for example about 1 minute, but longer periods may be employed dependent on the crosslinker used. As the films may dry quickly this property may also reduce the mobility of the crosslinkers, reducing the rate of crosslinking. Adipic acid is sparingly soluble in water. Consequently when adipic acid is used the majority of the crosslinker may be present in the form of dispersed particles. This may reduce the surface area and therefore the number of reactive carboxylic acid groups available to participate in the crosslinking reaction between carboxylic acid and hydroxyl groups from polyvinyl alcohol.

When there is insufficient crosslinker present in the composition there may be an insufficient degree of crosslinking with the result that there may be little or no enhancement of film properties. An amount of about 1% adipic acid may be an optimum amount as there is no blanching and the Cobb values after a 10-minute Cobb test are reduced quite significantly. Having more than about 1% adipic acid is less effective, as although blanching is prevented the Cobb value may not be further reduced.

The rheology modifier when present, may be selected from the group consisting of: xanthan gum, cellulose ether, carboxymethyl cellulose, guar gum, polysaccharides, associative thickeners such fully hydrolysed polyacrylic acid, and polyurethane thickeners, and mixtures thereof.

The rheology modifier may be present in the dispersion in an amount from about 0.05 wt % to about 3 wt %.

A preferred rheology modifier is xanthan gum.

The compositions of the present invention provide several advantages over previously known biopolymer dispersions, particularly those that consist only of a biopolymer, polyvinyl alcohol as stabilising agent and a rheology modifier. The water resistance of a film coated onto a cellulosic substrate as measured by the Cobb value may be increased. The appearance of the film may be maintained after exposure of water. Unexpectedly, the films have been found not to blanch, that is not to develop a whitened appearance. Furthermore, exemplary compositions in accordance with this invention exhibit an advantageous combination of low water absorption and resistance to blanching.

The compositions may further comprise a wax or tackifier.

Exemplary waxes and tackifiers are carnauba wax, beeswax, polyethylene, copolymers of polyethylene, oxidized polyethylene, copolymers of oxidized polyethylene, polyethers, lanolin, shellac, paraffin, candelilla, microcystalline waxes, soy wax, montan wax, rosin ester, terpene resin, terpene-phenol resin, terpene phenol, pentaerythritol rosin ester, a modified terpene resin, a polyterpene, a phenol modified copolymer of styrene, and alpha methyl styrene, hydrocarbon resins and mixtures thereof.

Exemplary preferred waxes are selected from the group consisting of: carnauba wax, beeswax, polyethylene, copolymers of polyethylene, oxidized polyethylene, copolymers of oxidized polyethylene, polyethers, lanolin, shellac, paraffin, candelilla, microcystalline waxes, soy wax, montan wax and mixtures thereof.

An amount of wax of about 1 wt % to about 12 wt %, preferably about 2 wt % to about 10 wt %, more preferably about 4.0 wt % to about 8.0 wt % may be employed.

Use of a wax in the composition may provide several advantages. Water repellence may be improved so that water forms beads on the surface of the film. The wax may increase the hydrophobicity of the coating, increasing water repellent properties and reducing the absorption of water by the coating. A reduced Cobb value may be obtained. Use of a wax may reduce the amount of biopolymer required. A more glossy appearance to the film may be achieved.

The water absorption capacity of a cellulosic material may be measured as a Cobb Value. The Cobb value is the mass of water ($gm^{-2}$) absorbed in a specific time, usually 60 or 120 seconds, by a laminar cellulosic material such as paper or paperboard under depth of 1 cm of water. The test is carried out in a device which permits only one side of the sheet to be exposed to water.

The compositions of the present invention and composites, including coatings comprising the compositions, provide many advantages in comparison to previously known products.

Use of a blend in accordance with this invention may improve water resistance in comparison to a crosslinked PBS film. In an embodiment a blend of polybutylsuccinate (PBS) and polycaprolactone (PCL), which has not been cross linked, may improve water resistance in comparison to a crosslinked polybutylsuccinate film. An unexpected advantage is a reduction in the moisture vapour transmission rate (MVTR), whether or not crosslinked. The use of a PBS/PCL blend may provide the advantage of reducing the minimum film forming temperature (MFFT) of the dried polymer film. This provides films which may be dried at a lower temperature.

According to a second aspect of the present invention, a method of manufacture of a biopolymer coated cellulosic article comprises the steps of:

- applying an aqueous biopolymer composition in accordance with the first aspect of the present invention to a surface of a cellulosic substrate to form a coated substrate;
- allowing water to vaporise from the substrate to form a dry coated substrate; and
- heating the dry coated substrate to cure the composition to form a biopolymer film coated article.

The substrate may comprise a cellulosic material such as a cellulosic paper, paperboard, construction paper, kraft paper, art paper and coated paper or biopolymer film. The compostable coating has a coat weight from about 1 to about 20 grams per square meter ($gm^{-2}$), preferably about 5 to 15 $gm^{-2}$ on a dry weight basis.

According to a third aspect of the present invention, a coated article comprises a cellulosic or biopolymer substrate coated with a film formed from a coating composition in accordance with the first aspect of the present invention. The article may be formed by the method of the second aspect of the present invention.

The article may comprise a laminar or sheet material which may be used for manufacture of packaging, containers, for example for food products.

In the present specification, percentages and other amounts are by weight, unless otherwise stated, and are selected from any ranges quoted to a total of 100%.

The invention is further described by means of example but not in any limitative sense.

EXAMPLE 1

Polycaprolactone Polybutylene Succinate Adipate Blends.

Polycaprolactone (PCL) and polybutylene succinate adipate (PBSA) blends were manufactured using a high-pressure reactor (HPR). These were all stabilised using polyvinyl alcohol (PVOH). The PCL, PBSA and PVOH were all heated to 110° C. and stirred for one hour maintaining this temperature. Water was then slowly added to the vessel over a period of 30 to 45 minutes before the batch was cooled and the pressure was released. The dispersion was tested with and without crosslinker. The crosslinker was post-added to the dispersion and stirred until homogeneous. The formulations were as follows:

TABLE 1

Index of PBSA formulations

| Raw Material | Example 1 % of formulation | Example 2 % of formulation | Example 3 % of formulation |
|---|---|---|---|
| PBSA (FD92PM) | 36 | 18 | 18 |
| PCL (CAPA 6250) | 0 | 18 | 18 |
| Antioxidant | 0.5 | 0.5 | 0.5 |
| Wax | 4 | 4 | 4 |
| Crosslinker | 1 | 0 | 1 |
| PVOH | 2.67 | 2.67 | 2.67 |
| Water | 55.83 | 56.83 | 55.83 |

TABLE 2

Index of formulations with and without coalescing agent

| Raw Material | Example 3 % of formulation | Example 4 % of formulation |
|---|---|---|
| PBSA (FD92PM) | 18 | 18 |
| PCL (CAPA 6250) | 18 | 18 |
| Antioxidant | 0.5 | 0.5 |
| Wax | 4 | 4 |
| Adipic acid | 1 | 1 |
| Coalescent | 0 | 1 |
| PVOH | 2.67 | 2.67 |
| Water | 56.83 | 55.83 |

TABLE 3

Summary of PBSA/PCL film properties

| | Film properties | | | | | | |
|---|---|---|---|---|---|---|---|
| | MFFT | Cobb value (g/m$^2$) | | | Heat seal | | MVTR value |
| Example | (° C.) | 2 mins | 5 mins | 10 mins | temp (° C.) | Kit value | (g/m$^2$ · day) |
| 1 | 85-90 | 3.43 | 9.29 | 14.98 | 110 | 4 | 293.88 |
| 2 | 82-85 | 3.38 | 7.78 | 13.63 | 110 | 12 | 221.26 |
| 3 | 82-85 | 3.37 | 5.92 | 12.17 | 110 | 12 | 178.24 |
| 4 | 72-75 | 2.81 | 5.36 | 11.57 | 110 | 12 | 163.93 |

FIG. 1: All films were single coated at 10 gsm on Sappi paper and film formed in an oven at 110° C. for 1 minute. MVTR was tested on double coated films.

Incorporating polycaprolactone (CAPA 6250) into the PBSA formulation may result in a considerable improvement in the Cobb values. Comparison of the reduced Cobb value of an un-crosslinked PBSA/PCL film to a crosslinked PBSA film demonstrated that incorporating PCL into the formulation significantly improves the water resistance of the film. It should be noted however, that this improvement may be greatest after longer Cobb tests have been completed. Furthermore, the un-crosslinked and crosslinked PBSA/PCL films perform comparably after a 2-minute Cobb test has been conducted. The effect of crosslinking on the film may not be detected until longer Cobb tests have been conducted. For example, after a 10-minute Cobb test had been conducted the Cobb value decreased from 13.63 g/m$^2$ to 12.17 g/m$^2$ in the un-crosslinked and crosslinked film, respectively. In addition to improving the water resistance of the film, crosslinking of the PBSA/PCL film may also prevent blanching after the film has come into contact with water.

Additionally, the results showed that there was also a considerable improvement of the grease resistance of the film. A PBSA film has very poor grease resistance and may have a kit value of only 4. The addition of PCL into the formulation may greatly improve the grease resistance of the film. A kit value of 12 may be achieved. Crosslinking may not improve the grease resistance.

All films which underwent MVTR testing were double coated. As the formulations all contained wax the hydrophobicity of the film was increased and the film could not be overcoated by the same film once it has been film-formed as the top film pooled considerably. Therefore, to overcoat for MVTR testing the first film was air-dried which resulted in formation of a white chalky looking film before over coating and stoving in the oven at 110° C. for 1-minute and resulted in formation of a glossy film. The films were double coated for MVTR testing to prevent the result being influenced by any potential pinholes formed. The addition of PCL alone improved the MVTR value from 293.88 to 221.26 g/m$^2$·day. Crosslinking of the PVOH in the PBSA/PCL formulation improved the water resistance of the film. This was shown in the further reduction of the MVTR value to 178.24 g/m$^2$·day.

The minimum film formation temperature was observed to decrease from 85-90° C. to 82-85° C. by incorporation of PCL (CAPA 6250) into the formulation. There is no benefit of crosslinking the PVOH with adipic acid in reduction of MFFT.

The addition of a citrate ester coalescent improves the appearance of the film. The film was observed to be much glossier. The use of a coalescent gave enhanced water resistance of the film. This is demonstrated in the Cobb and MVTR values being much improved. The Cobb value after a 10-minute Cobb test had been done was reduced from 12.17 g/m$^2$ to 11.57 g/m$^2$ with the use of a coalescent. The enhanced water resistance was shown in the reduction in MVTR. The use of the citrate ester reduced the MVTR from 178.24 to 163.93 g/m$^2$·day. Other film properties such as grease resistance are not affected as the kit value of the blend is already at a maximum value of 12 and therefore could not be improved further. Finally, the addition of 1% citrate ester reduces the MFFT from 82-85° C. to 72-75° C.

EXAMPLE 2

Polycaprolactone and Polybutylene Succinate Blends.

The PCL and PBS blends were manufactured using a high-pressure reactor (HPR). These were all stabilised using PVOH. The PCL, PBS and PVOH were all heated to 130° C. and stirred for one hour maintaining this temperature. Water was then slowly added to the vessel over a period of 30 to 45 minutes before the batch was cooled and the pressure was released. The dispersion was tested with and without crosslinker. The crosslinker was post-added to the dispersion and stirred until homogenous. The formulations are as follows:

TABLE 1

Index of formulations with and without crosslinker

| Raw Material | Example 5 % of formulation | Example 6 % of formulation | Example 7 % of formulation |
|---|---|---|---|
| PBS (FZ71PM) | 36 | 18 | 18 |
| PCL (CAPA 6250) | 0 | 18 | 18 |
| Antioxidant | 0.5 | 0.5 | 0.5 |
| Wax | 4 | 4 | 4 |
| Adipic acid | 1 | 0 | 1 |
| PVOH | 2.67 | 2.67 | 2.67 |
| Water | 56.83 | 56.83 | 55.83 |

TABLE 2

Summary of PBS/PCL film properties

| Example | Film properties | | | | | | |
|---|---|---|---|---|---|---|---|
| | MFFT (° C.) | Cobb value (g/m$^2$) 2 mins | 5 mins | 10 mins | Heat seal temp (° C.) | Kit value | MVTR value (g/m$^2$ · day) |
| 5 | 115-120 | 1.97 | 4.77 | 9.95 | 120 | 12 | 222.48 |
| 6 | 99-104 | 1.80 | 4.17 | 8.62 | 120 | 12 | 120.50 |
| 7 | 99-104 | 1.37 | 3.73 | 6.76 | 120 | 12 | 63.53 |

FIG. 1: All films were single coated at 10 gsm on Sappi paper and film formed in an oven at 130° C. for 1 minute. MVTR was tested on double coated films.

Blending PCL with PBS provided a film with improved water resistance. Similarly, to the PBSA/PCL blend, a significant improvement was not seen on the 2-minute Cobb value. When longer Cobb tests were conducted, the improved water resistance of the film became more apparent. For example, a 10-minute Cobb test on a PBS film gave a Cobb value of 9.95 g/m$^2$. This was reduced to 8.62 g/m$^2$ on the PBS/PCL blend. It should be noted that the PVOH in the PBS film had been crosslinked with adipic acid and the PBS/PCL film was un-crosslinked. Crosslinking the PVOH in the PBS/PCL blend further improved the water resistance of the film. This was shown in the reduced Cobb value even after two minutes. There were also no signs of blanching on the crosslinked film. Blanching had been seen on un-crosslinked films when longer Cobb tests had been conducted.

The PBS film already had a kit value of 12. Blending with PCL did not appear to have a benefit on the grease resistance as the kit value was already at the maximum. There was no change to the heat seal temperature by blending in the PCL or by crosslinking.

All films which were subjected to MVTR tested were double coated to prevent any possible pin hole formation influencing the value. The PBS/PCL blend was found to significantly improve the MVTR value from 222.45 $g/m^2$·day to 120.50 $g/m^2$·day. This further demonstrated that the incorporation of PCL greatly improved the water resistance of the film. Additionally, the use of crosslinked PBS/PCL film almost halved the MVTR value to 63.53 $g/m^2$·day. Crosslinking the PVOH greatly improved the water resistance of the film. This was demonstrated by the substantial reduction in the MVTR rate.

The minimum film formation temperature was found to decrease from 115-120° C. to 99-104° C. by incorporation of PCL into the formulation. There is no benefit of crosslinking the PVOH with adipic acid in reducing the MFFT value.

Test Methods

Cobb Value—The Cobb value is defined as the amount of water absorbed in a specific time by 1 square meter of paper under 1 cm of water measured in $g/m^2$. The test is in accordance with Tappi T 441. The specimen is weighed to the nearest 0.01 g and placed into the specimen holder. 100 cm 3 of demineralised water is poured into the specimen holder and the timer is started. Approximately ten seconds before the end of the test, the water is poured out and the substrate is dried by placing blotting paper on top of the specimen and rolling with a hand roller. The specimen is then reweighed, and the Cobb value calculated. The specified times used in this investigation are 2, 5 and 10 minutes.

Blanching—This defines a whitened area of the film after exposure to water. It is an internal test which is determined by eye.

Grease resistance kit test—The test is in accordance with Tappi T 559. The kit number is assigned when the coating has been visually affected by the mixture.

Water vapor tranmission rate—WVTR is defined as the steady state rate at which water vapor permeates through a film at specified conditions of temperature and relative humidity. The films tested in this report were subjected to tropical conditions of 37.8° C. and 90% RH (relative humidity).

The invention claimed is:

1. An aqueous biopolymer dispersion composition comprising:

a blend of two or more biopolymers, consisting of polycaprolactone (PCL) and one or more further biopolymers selected from the group consisting of: polybutylene adipate terephthalate (PBAT), polybutylene succinate (PBS), polybutylene succinate adipate (PBSA), polylactic acid (PLA), poly(3-hydroxybutyrate) (PHB) and mixtures thereof, a stabilizing agent selected from the group consisting of: polyvinyl alcohol, fatty alcohol ethoxylates, ethylene oxide/propylene oxide (EO/PO) block copolymers, salts of fatty acids and mixtures thereof, a cross-linking agent, wherein the cross-linking agent is chosen from the group consisting of a bifunctional carboxylic acid and a bifunctional aldehyde;

optionally, a rheology modifier;

optional further ingredients; and water.

2. The aqueous biopolymer dispersion composition of claim 1, wherein the blend of two or more biopolymers are polycaprolactone (PCL) and one or more further biopolymers selected from the group consisting of: polybutylene succinate (PBS), polybutylene succinate adipate (PBSA) and mixtures thereof.

3. The aqueous biopolymer dispersion composition of claim 2, wherein a ratio by weight of the polycaprolactone (PCL) to further biopolymer or biopolymers that is in a range of PCL to further biopolymer or biopolymers of from about 60:40 to about 1:20.

4. The aqueous biopolymer dispersion composition of claim 1, wherein the blend of two or more biopolymers is present in the aqueous biopolymer dispersion composition in an amount of from 10 wt % to 80 wt % based on a total weight of the aqueous biopolymer dispersion composition.

5. The aqueous biopolymer dispersion composition of claim 1 further comprising a wax or a tackifier selected from the group consisting of: a carnauba wax, a beeswax, a polyethylene, a copolymer of polyethylene, an oxidized polyethylene, a copolymer of oxidized polyethylene, a polyether, a lanolin, a shellac, a paraffin, a candelilla, a microcystalline wax, a soy wax, a montan wax, a rosin ester, a terpene resin, a terpene-phenol resin, a terpene phenol, a pentaerythritol rosin ester, a modified terpene resin, a polyterpene, a phenol modified copolymer of styrene, an alpha methyl styrene, a hydrocarbon resin, and mixtures thereof.

6. The aqueous biopolymer dispersion composition of claim 1, wherein the stabilizing agent is polyvinyl alcohol.

7. The aqueous biopolymer dispersion composition of claim 1, wherein the stabilizing agent is present in the aqueous biopolymer dispersion composition in an amount of from 1 wt % to 6 wt %.

8. The aqueous biopolymer dispersion composition of claim 1, wherein the rheology modifier is selected from the group consisting of: xanthan gum, cellulose ether, carboxymethylcellulose, guar, a polysaccharide, a fully hydrolyzed polyacrylic acid, a polyurethane thickener, and mixtures thereof.

9. The aqueous biopolymer dispersion composition of claim 1, wherein the cross-linking agent is selected from the group consisting of: oxalic acid, malonic acid, succinic acid, glutaric acid, pimelic acid, suberic acid, azelaic acid, sebacic acid, undercanedioic acid, dodecanedioic acid, brassylic acid, thapsic acid, japanic acid, phellogenic acid, equisetolic acid, maleic acid, fumaric acid, acetylenedicarboxylic acid, glutaconic acid, traumatic acid, muconic acid, glutinic acid, citraconic acid, mesaconic acid, itaconic acid, tartronic acid, mesoxalic acid, malic acid, tartaric acid, oxaloacetic acid, aspartic acid, α-hydroxyglutaric acid, arabinaric acid, acetonedicarboxylic acid, α-ketoglutaric acid, glutamic acid, diaminopimelic acid, saccharic acid, malondialdehyde, succinaldehyde, glutaraldehyde, isocitric acid, aconitric acid, propane-1,2,3-tricarboxylic acid, trimesic acid and mixtures thereof.

10. The aqueous biopolymer dispersion composition of claim 1, wherein the cross-linking agent is selected from the group consisting of: adipic acid, maleic acid, glyoxal, citric acid and mixtures thereof.

11. The aqueous biopolymer dispersion composition of claim 10, wherein the cross-linking agent is present in an amount of from 0.05 wt % to 3 wt %.

12. The aqueous biopolymer dispersion composition of claim 1 further comprising a wax or a tackifier, wherein an amount of the wax or the tackifier is from 1 wt % to 12 wt %.

13. A method of manufacture of a biopolymer coated cellulosic article comprising the steps of:

applying the aqueous biopolymer dispersion composition of claim 1 to a surface of a cellulosic substrate to form a coated substrate;

allowing water to vaporize from the coated substrate to form a dry coated substrate; and heating the dry coated substrate to cure the aqueous biopolymer dispersion composition to form a biopolymer film coated article.

14. A coated article comprising a cellulosic substrate coated with a film formed from the aqueous biopolymer dispersion composition of claim 1.

15. The aqueous biopolymer dispersion composition of claim 5, wherein the wax or the tackifier is present in an amount of from 1 wt % to 12 wt %.

16. An aqueous biopolymer dispersion composition comprising:

a blend of two or more biopolymers, consisting of a first biopolymer that is polycaprolactone (PCL) and a second biopolymer selected from the group consisting of: polybutylene adipate terephthalate (PBAT), polybutylene succinate (PBS), polybutylene succinate adipate (PBSA), polylactic acid (PLA), poly(3-hydroxybutyrate) (PHB) and mixtures thereof, a stabilizing agent selected from the group consisting of: polyvinyl alcohol, fatty alcohol ethoxylates, ethylene oxide/propylene oxide (EO/PO) block copolymers, salts of fatty acids and mixtures thereof, a cross-linking agent, wherein the cross-linking agent is chosen from the group consisting of a bifunctional carboxylic acid and a bifunctional aldehyde;

a rheology modifier; and water.

17. The aqueous biopolymer dispersion composition of claim 16, wherein the cross-linking agent is selected from the group consisting of: oxalic acid, malonic acid, succinic acid, glutaric acid, pimelic acid, suberic acid, azelaic acid, sebacic acid, undercanedioic acid, dodecanedioic acid, brassylic acid, thapsic acid, japanic acid, phellogenic acid, equisetolic acid, maleic acid, fumaric acid, acetylenedicarboxylic acid, glutaconic acid, traumatic acid, muconic acid, glutinic acid, citraconic acid, mesaconic acid, itaconic acid, tartronic acid, mesoxalic acid, malic acid, tartaric acid, oxaloacetic acid, aspartic acid, $\alpha$-hydroxyglutaric acid, arabinaric acid, acetonedicarboxylic acid, $\alpha$-ketoglutaric acid, glutamic acid, diaminopimelic acid, saccharic acid, malondialdehyde, succinaldehyde, glutaraldehyde, isocitric acid, aconitric acid, propane-1,2,3-tricarboxylic acid, trimesic acid and mixtures thereof.

18. The aqueous biopolymer dispersion composition of claim 17 further comprising a wax or a tackifier selected from the group consisting of: a carnauba wax, a beeswax, a polyethylene, a copolymer of polyethylene, an oxidized polyethylene, a copolymer of oxidized polyethylene, apolyether, a lanolin, a shellac, a paraffin, a candelilla, a microcystalline wax, a soy wax, a montan wax, a rosin ester, a terpene resin, a terpene-phenol resin, a terpene phenol, a pentaerythritol rosin ester, a modified terpene resin, a polyterpene, a phenol modified copolymer of styrene, an alpha methyl styrene, a hydrocarbon resin, and mixtures thereof.

19. The aqueous biopolymer dispersion composition of claim 18, wherein the blend of two or more biopolymers is present in an amount of from 10 wt % to 80 wt %;

the stabilizing agent is present in an amount of from 1 wt % to 6 wt %;

a ratio by weight of the first biopolymer to the second biopolymer that is in a ratio range of from about 60:40 to about 1:20;

the cross-linking agent is present in an amount of from 0.05 wt % to 3 wt %; and the wax or the tackifier is present in an amount of from 1 wt % to 12 wt %.

* * * * *